UNITED STATES PATENT OFFICE.

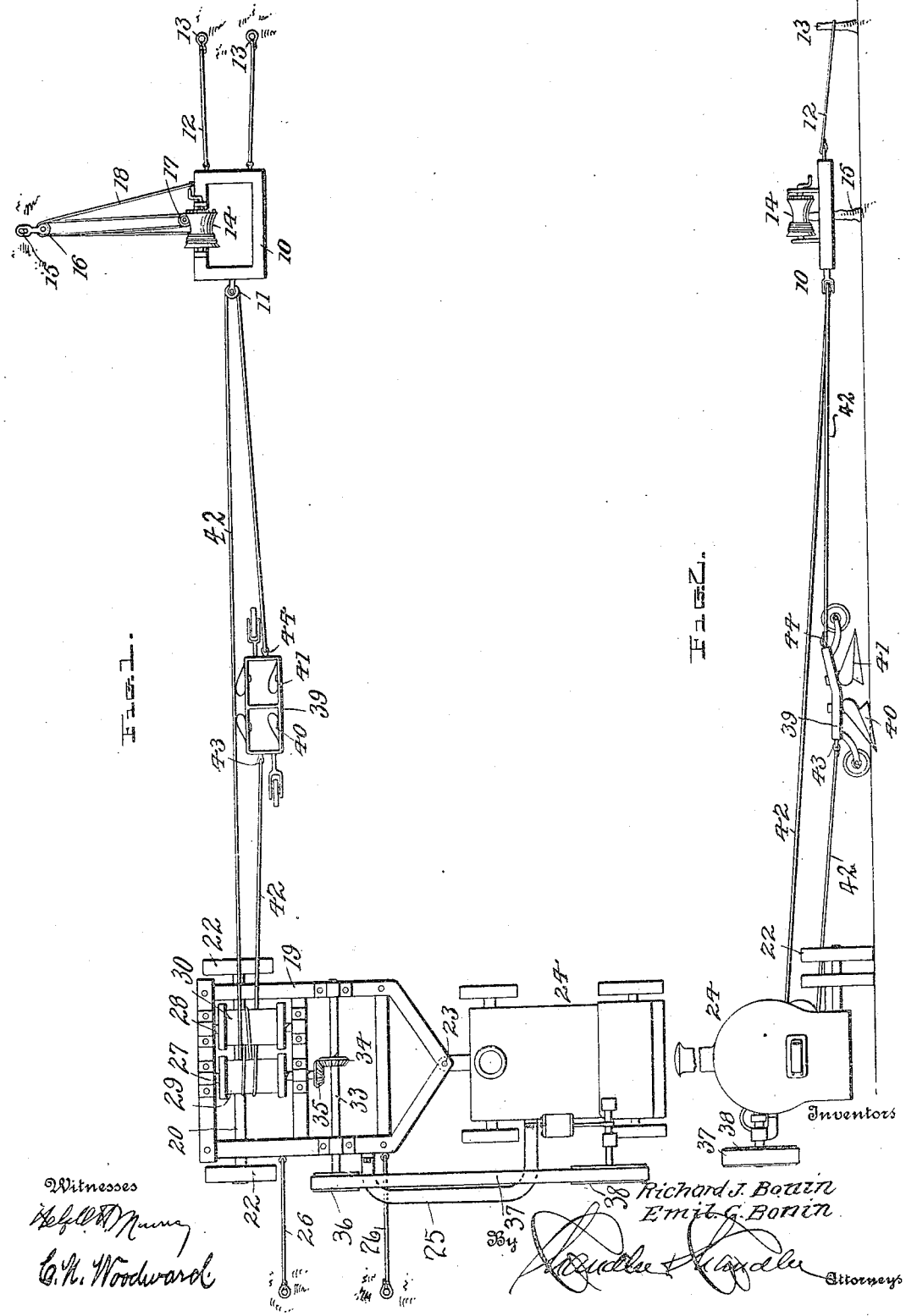

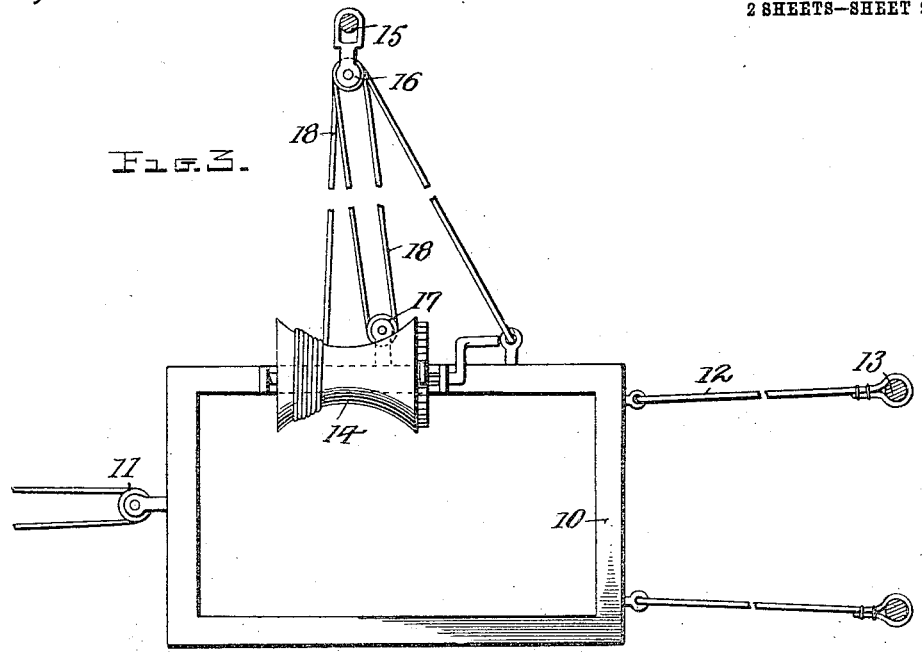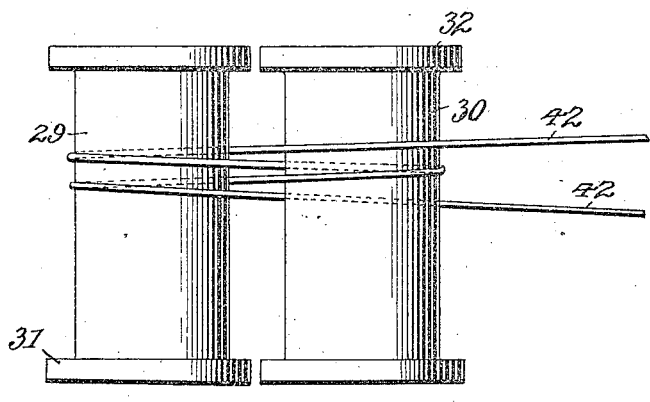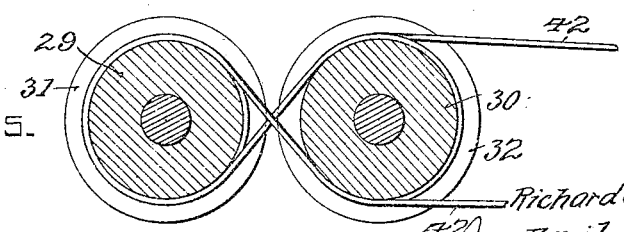

RICHARD J. BONIN AND EMIL C. BONIN, OF COLFAX, NORTH DAKOTA.

PLOWING APPARATUS.

949,879.　　　　　Specification of Letters Patent.　　Patented Feb. 22, 1910.

Application filed June 22, 1908.　Serial No. 439,777.

*To all whom it may concern:*

Be it known that we, RICHARD J. BONIN and EMIL C. BONIN, citizens of the United States, residing at Colfax, in the county of Richland, State of North Dakota, have invented certain new and useful Improvements in Plowing Apparatus; and we do hereby declare the following to be a full, clear, and exact description of the invention, such as will enable others skilled in the art to which it appertains to make and use the same.

This invention relates to apparatus for plowing land, and has for one of its objects to improve the construction and increase the efficiency and utility of devices of this character.

With these and other objects in view the invention consists in three structures, an anchoring structure located at one side of the field, an operating structure located at the opposite side of the field, and a plow structure adapted to be drawn back and forth between the anchoring structure and the operating structure.

The invention further consists in certain novel features of construction as hereinafter shown and described, and then specifically pointed out in the claims, and in the drawings illustrative of the preferred embodiment of the invention, Figure 1 is a plan view of the improved apparatus. Fig. 2 is a side elevation of the same. Fig. 3 is an enlarged plan view of the framework of the anchoring portion of the apparatus. Figs. 4 and 5 are sectional views showing details.

The improved apparatus comprises three parts, first an operating portion comprising a rectangular frame carrying winding drums and with a motor associated therewith, the motor preferably being a traction engine so that the framework supporting the operating drums which is mounted upon carrier wheels may be moved along one side of the field which is to be plowed.

Another portion of the apparatus comprises a frame carrying a winding windlass and a cable sheave adapted to be employed for drawing the anchor frame over the ground along the opposite side of the field from the operating mechanism and with means for anchoring the frame to the ground, and a reversible or double plow device adapted to be drawn back and forth over the ground between the operating apparatus and the anchoring apparatus, and plow a furrow at each trip of the plows.

The anchoring apparatus comprises a rectangular frame 10 of any required size and provided at one side with a guide sheave 11 and with anchor chains or similar devices 12 at the other side, the free ends of the member 12 connected to stakes 13 driven into the ground, or by other fastening means.

Attached to one side of the frame 10 is a winding windlass 14 and located at a suitable distance forwardly of the frame 10 is a stake 15 or other stationary support to which a cable sheave 16 is connected, while another cable sheave 17 is connected to the frame 10 adjacent to the windlass.

A cable 18 is connected at one end to the windlass 14 and thence extended through the guide sheaves 16—17 and with its opposite end connected to the frame 10 so that rotary motion applied to the windlass 14 will wind up the cable and draw the frame 10 toward the stake 15, the plurality of guide sheaves providing for the requisite increase of power so that less power will be required to operate the windlass than if the cable extended directly between the windlass and the stake. The frame 10 with its associated elements will be located at one side of the field and adapted to be drawn intermittently along the side of the field as the plowing proceeds, as hereafter explained.

The operating mechanism is located at the opposite side of the field and adapted to be drawn along that side of the field as the plow proceeds and at the same time that the frame 10 is moved.

The operating mechanism comprises a rectangular frame 19 having an axle 20 near one end and carrying ground wheels 22, while the opposite end of the frame 19 is connected by a coupling device 23 to a traction engine of any suitable form and indicated as a whole at 24.

The frame 19 and its attachments may thus be drawn from place to place by the engine, and when the apparatus is to be transported from field to field or from one locality to another, the anchoring frame and the plowing device will preferably be loaded upon the frame 19 and thus disposed in position to be conveniently transported. The frame 19 is suitably braced from the engine 24 when in operation as indicated at 25, so that the frame 19 and the operating mechanism between the frame and the engine will operate with greater steadiness as hereafter more fully explained. The frame 19 is likewise anchored by suitable guide members 26 to resist the tendency to be moved toward the anchoring frame when the strains are applied, as hereafter explained.

Mounted for rotation upon the frame 19 are two shafts 27—28 carrying winding drums 29—30, the winding drums being disposed together and provided with end flanges 31—32. Mounted for rotation upon the frame 19 is a main drive shaft 33 carrying a beveled gear 34 meshing with a beveled gear 35 upon the drum shaft 27 so that motion imparted to the shaft 33 will be communicated to the drum 29. The shaft 33 is provided with a belt pulley 36 over which a drive belt 37 leads from the drive pulley 38 of the engine 24. By this means, the motion of the engine will be communicated to the drum 29, as will be obvious.

The plowing portion of the device consists of an oblong frame 39 with a plurality of plows at the opposite ends and reversely arranged, or with the plows 40 at one end directed outwardly and the plows 41 at the opposite end likewise directed outwardly. The plows are arranged upon the frame 39 so that when the plows 40 are in operative position the plows 41 will be elevated or in inoperative position, and then when the plows 41 are disposed in operative position the plows 40 will be elevated out of operative position. Thus when the frame 39 with the plows attached is drawn in one direction, the plows 40 will form two furrows while the plows 41 will remain in an inoperative position, and then when the movement of the frame 39 is reversed or drawn in the opposite direction, the plows 41 will form two spaced furrows and the plows 40 will be disposed in an inoperative position. It will thus be obvious that when the frame 39 is drawn back and forth across a field two furrows will be plowed at each single trip, or four furrows at each round trip.

A cable 42, preferably of wire, is connected at 43 to the frame 39 and is conducted thence under the drum 30 and thence between the drums and around the drum 29 and thence again between the drums and around the guide sheave 11 and back to the frame 39 and connected thereto at 44. The axial lines of the drums 29—30 are arranged horizontally and in parallel relations, and form an effectual grip device to prevent the cable from slipping when operated. The portion of the cable 42 leading from the coupling 43 of the plowing device leads beneath the drum as shown, and is thus operated relatively close to the ground, while the return portion of the cable leading from the upper surface of the idler drum 30 is maintained above the upper line of the plowing apparatus. The arrangement shown of the drums 29—30 is thus an essential and novel feature, and adds materially to the operativeness of the device. By this arrangement it will be obvious that when motion is imparted to the drum 29 in one direction the portion of the cable 42 between the plowing device and the drums will be drawn toward the frame 19 and cause the plows 40 to operate while the plows 41 remain idle, and when the plowing device has reached the limit of its movement toward the frame 19, the motion of the engine is reversed causing the portion of the cable between the guide sheave 11 and the plowing device 39 to be drawn toward the anchoring frame 10, and thus cause the plows 41 to operate while the plows 40 remain idle.

It will be understood that between each movement of the plows the anchoring frame 10 and the frame 19 supporting the operating mechanism will be moved a distance equal to the furrows made by the plows. Thus at the end of each single trip the guides 12 will be released and the windlass 14 operated to draw the frame 10 toward the stationary member 15 a distance equal to the furrows which are to be made at the next operation and the frame 19 moved by the operation of the engine 24 a corresponding distance, and then at the completion of the next single trip of the plows the frame 10—19 are again adjusted, and so on until the field is entirely plowed.

The drums 29—30 will be disposed relatively close together or just sufficiently spaced to permit the cables to pass loosely between them, the drum 30 operating as an idler drum while the motion is imparted to the drum 29 only, and by weaving the cable 42 around and between the drums as shown, a sufficient grip is applied to cause the rotation of the drum 29 to positively draw the cable back and forth to operate the frame 39, as above described. This is an important feature of the invention and adds materially to its efficiency and utility, and enabling the whole apparatus to be operated by one single length of wire.

The frame 39 may be of any required size to support any required number of the plows but for the purpose of illustration two plows are connected to each end of the frame and arranged to operate alternately as shown.

The cable 42 may be of any required length to correspond to any size of field.

The improved apparatus is designed more particularly for use in prairie countries where the fields are substantially level and without stones or other obstructions, and when thus employed will plow very large and extensive fields in a minimum time and likewise with the minimum of power and labor.

The engine employed will be of the usual traction construction, and any traction engine in possession of the farmer may be readily utilized by providing a simply constructed coupling means 23 between the frame 19 and the engine 24, and attaching a simply constructed brace element 25 between the engine and the frame during the time that the device is being employed for operating the plowing apparatus, the brace being removed when the apparatus is to be transported from place to place as for instance from farm to farm or from one field to another.

While the structure shown is the preferred embodiment of the invention it will be understood that changes may be made within the scope of the appended claims without departing from the principle of the invention or sacrificing any of its advantages.

What is claimed, is:—

1. An apparatus of the class described comprising a supporting frame, a drum mounted for rotation upon said frame, means for operating said drum, an idler drum mounted for rotation upon said frame and spaced slightly from said operated drum with the axial lines of the drums horizontal, an anchoring device spaced from said supporting frame, a cable guide sheave carried by said anchoring device, a plowing apparatus, and a cable connected at one end to said plowing apparatus and carried thence beneath said idler drum, and upward and around said driven drum and thence upwardly and around said idler drum and thence upwardly between the drums and around said driven drum, and thence upwardly between the drums and over the idler drum and thence around the guide sheave with the other end connected to the anchoring device, whereby the pulling strains are applied relatively near the ground, and a grip applied to the cable to prevent slipping.

2. An apparatus of the class described comprising a supporting frame, drums mounted for rotation upon said frame and spaced slightly apart, with their axes in the same alinement, one of said drums being an idler, a frame carrying a motor, means for movably coupling the motor frame to the supporting frame, detachable means for rigidly coupling the motor frame and the supporting frame, means for transmitting the motion of said motor to one of said drums, a plowing apparatus, and a cable connected to said plowing apparatus and carried around and between said drums.

3. An apparatus of the class described comprising a supporting frame, drums mounted for rotation upon said frame and spaced slightly apart with their axial lines horizontal, a frame carrying a motor, means for movably coupling the motor frame to the supporting frame, a bar movably connected at the ends respectively to said motor frame and said supporting frame, means for transmitting the motion of said motor to one of said drums, an anchor device carrying a cable sheave, a plowing apparatus, and a cable connected at one end to said plowing apparatus and carried thence beneath and between said drums and around the same and thence through said guide sheave and attached to the plowing apparatus at the other end.

In testimony whereof, we affix our signatures in presence of two witnesses.

RICHARD J. BONIN.
EMIL C. BONIN.

Witnesses:
H. J. HAGEN,
J. STOFNE.